United States Patent [19]

Lindblad et al.

[11] 3,868,440

[45] Feb. 25, 1975

[54] RECOVERY OF METAL VALUES FROM COPPER SLAG

[75] Inventors: Kenneth O. Lindblad; Ralph E. Dufresne, both of Deer Lodge, Mont.

[73] Assignee: The Anaconda Company, Butte, Mont.

[22] Filed: May 30, 1973

[21] Appl. No.: 365,243

[52] U.S. Cl.................... 423/41, 75/101 R, 75/115, 423/109, 423/150
[51] Int. Cl.......................... C01g 1/10, C22b 15/08
[58] Field of Search.......... 75/101 R, 119, 120, 117, 75/115; 423/150, 27, 36, 41, 109

[56] References Cited
UNITED STATES PATENTS

| | | | |
|---|---|---|---|
| 1,044,316 | 11/1912 | Wells | 75/119 |
| 1,770,866 | 7/1930 | Smith | 75/101 R |
| 1,983,274 | 12/1934 | Earle | 75/101 R |
| 2,850,357 | 9/1958 | Myers et al. | 75/115 |
| 2,934,428 | 4/1960 | Donaldson et al. | 75/101 R |
| 3,273,997 | 9/1966 | Wilson | 423/150 |
| 3,640,703 | 2/1972 | Cooper | 75/101 R |
| 3,684,489 | 8/1972 | Emicke et al. | 423/150 |
| 3,741,752 | 6/1973 | Evans et al. | 423/150 |

Primary Examiner—O. R. Vertiz
Assistant Examiner—Brian E. Hearn
Attorney, Agent, or Firm—Pennie & Edmonds

[57] ABSTRACT

A hydrometallurgical process for treating slag material, especially copper smelter slag material, comprises vigorously mixing the slag material with about one part by weight of sulfuric acid and about one part by weight of water for each part by weight of the slag material, and allowing the resulting mixture to react to produce a dry, solid material, containing the metal values of the slag in water-soluble form. These solubilized metal values may be separated by leaching from the insoluble silicious residue of the dry solid material.

7 Claims, 1 Drawing Figure

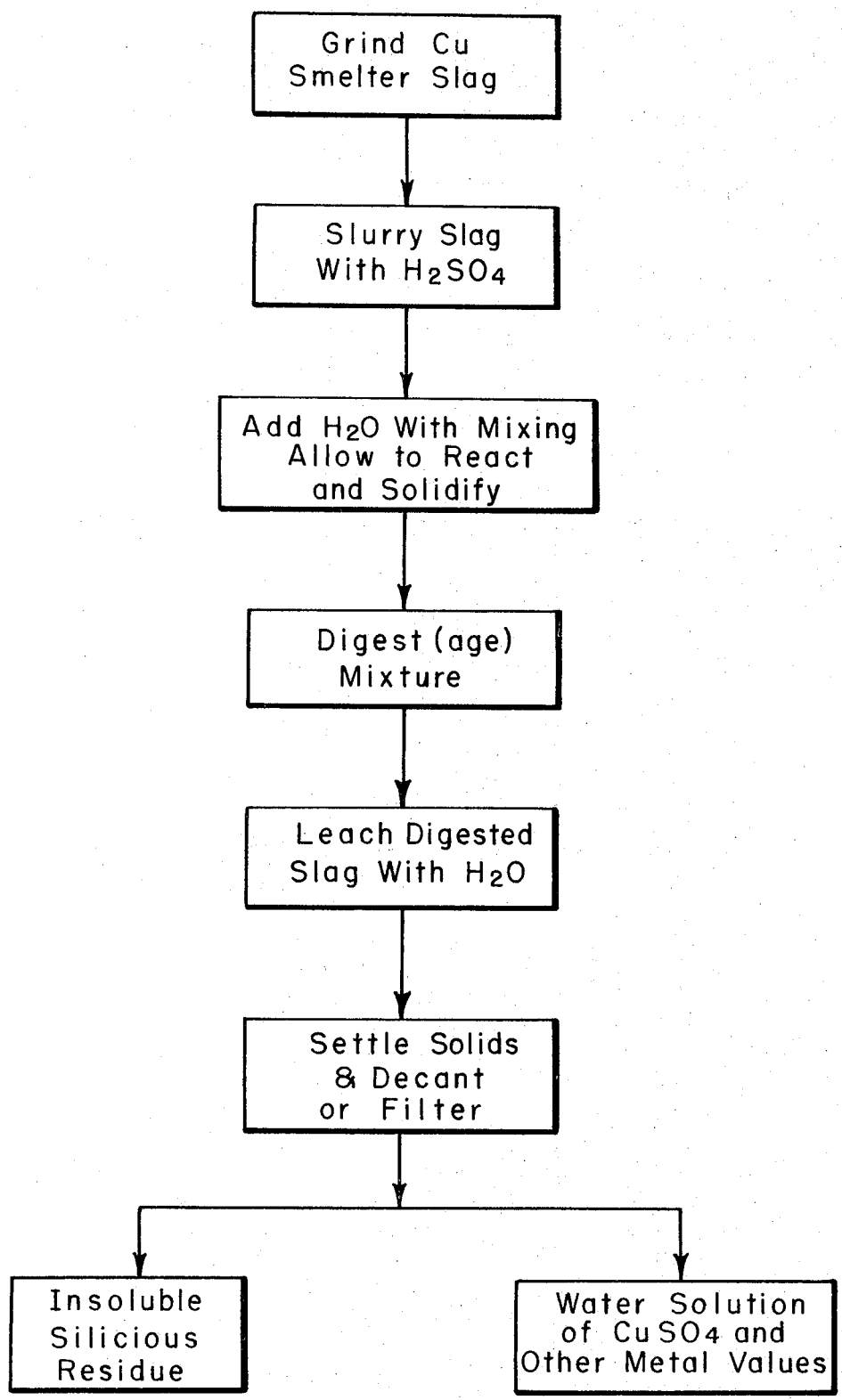

RECOVERY OF METAL VALUES FROM COPPER SLAG

BACKGROUND OF THE INVENTION

Slag material resulting from the smelting of ores, such sulfide copper ores, is generally considered a waste product. The slag material normally contains appreciable amounts of various metal values, including (depending on the nature of the ore) copper, iron, zinc, lead, and other materials all in combination with alkaline earth metals in a matrix of metallic and non-metallic silicates. The recovery of these metal values has not been found attractive up to the present time due to the complex nature of the slag material and the tendency of it to form gelatinous products upon processing.

Various methods have been proposed to leach the metal values of the slag material. U.S. Pats. Nos. 3,269,831, 3,273,997, and 3,288,597 show various processes for the leaching of slag material for the recovery of certain metallic and non-metallic constituents. These patents exemplify the complex parameters which are believed necessary to recover material from the waste product. Some processes involve the use of mineral acids in combination with alkali materials in complex procedures to attain the desired results. Other processes have involved selective leaching of copper from copper smelter slag with aqueous ammonia or nitric acid. Flotation processes have had only marginal success in the recovery of the values from slag material.

The various procedures which have been proposed have several disadvantages. In the majority of cases, they consume expensive reagents which are not readily available at the process site. Other processes give only marginal recovery of the desired metal values, and may form gel material during processing or require elaborate and specialized equipment.

SUMMARY OF THE INVENTION

The invention provides an improved hydrometallurgical process for the recovery of metal values from waste slag material which may be copper smelter slag, or slag from other smelting operations. The new process is exothermic is easy to carry out, and utilizes only readily available equipment and inexpensive reagents. The process involves mixing with vigorous agitation a unit part by weight of slag material and about a unit part by weight of concentrated sulfuric acid, incorporating in the resulting acid-slag mixture about a unit part by weight of water, and allowing the mixture to react to produce a dry, solid material without the formation of gelatinous substances. This dry, solid material consists mainly of water-soluble metal values and silicious residue material; and metal values are recovered from it by dissolving the water-soluble material in an aqueous solution and separating the resulting solution from the silicious residue. Subsequently the dissolved metal values are recovered from the solution in any suitable manner.

The acid and slag preferably are mixed vigorously to insure formation of a homogeneous reaction product. After initial reaction of the acid and slag, the substantially dry product is preferably allowed to age for at least several hours to increase the degree of conversion of metal values to water-soluble form. The acid-slag-water reaction is highly exothermic and heats the reaction mixture to an elevated, temperature, typically 75°C. to 100°C.; and aging preferably is accomplished by holding the dry, solid product at or near such autogenously developed elevated temperatures for a period of time of at least several hours, advantageously, say, 8 to 30 hours.

BRIEF DESCRIPTION OF THE DRAWING

FIG. 1 is a block diagram of the steps employed in a preferred embodiment of the process.

DETAILED DESCRIPTION OF THE INVENTION

The slag material to which this invention is particularly directed is the waste material obtained from reverberatory smelting of copper ore. The slag composition is somewhat variable and is dependent on many factors including the type and origin of original ore used, the particular smelting process, and weathering effects of different climates when the slag has been held in the open air for prolonged periods. Copper smelter reverberatory slags are complex materials comprising sulfides, oxides, silicates, glassy congoomerates of amorphous materials, and even some free copper. In general, the slag material has, due to its complex nature, been considered a waste product from which the metal values have been recoverable only by expensive and complex processes.

The process of this invention is one which combines readily available materials to leach available metal values from the slag material under conditions which do not produce undesirable gelatinous material. The process, furthermore, involves a simplified procedure which can be carried out in commonly available equipment and under economically attractive conditions.

The slag material is normally ground into particulate material for ease of handling and for obtaining optimal surface contact with the reagent materials of this process. The grinding may be by any mechanical means to form a particulate material which is preferably less than 100 mesh in size. Small particle size will allow for greater surface contact between the slag and reagent materials and will, therefore, favor rapid progress of the chemical reactions of the process.

The ground slag material is mixed with preferably about an equal amount by weight of concentrated sulfuric acid. The optimum acid-slag weight ratio will vary directly with the reactive metal value content of the slag material. The upper limit on the amount of sulfuric acid used depends somewhat on what is to be done with the digested slag. If copper is to be recovered, some excess of acid is desirable for complete digestion of metal values. Large excesses are to be avoided so that excessively acid solutions are not encountered in the subsequent water extraction step. However, if the object is only to neutralize waste acid without immediate recovery of copper, then a deficiency of acid may be desirable. Normally, the acid to slag ratio should be held near 1 to 1.

The acid-slag mixture has incorporated in it approximately an equal amount by weight of water per unit quantity by weight of original slag material. The wter may with advantage by added to the acid-slag mixture with constant agitation; but some or all of the water may be present in the slag or added to it prior to acid addition. The amount of water which is added is critical in that, if too little or too much water is added, it results in a reaction which does not raise the temperature of the mass enough to complete the digestion within a reasonable time. Furthermore, excess water causes formation of a gelatinous product, which is an undesirable result. It has been found that, by using approximately a 1:1 weight ratio of water to initial slag material, a substantially dry, crumbly product containing water-soluble metal sulfates and water-insoluble silicious residue will be formed. When a deficient amount of water is used, an excessively dry or hardpan residue containing undigested slag may result.

Under the controlled conditions herein stated, the sulfuric acid-water mixture attacks the major minerals in the slag, especially iron minerals, in an extremely rapid chemical reaction which releases a great deal of heat. Rapid mixing at this stage is essential to insure a homogeneous mass prior to solidification, which normally occurs within minutes after mixing. During this initial reaction, much of the excess water is driven off as steam and the silica is partially dehydrated. At this stage, the reacted mass is dry enough to be easily moved for stockpiling or for aging.

As indicated above, experimentation has revealed that satisfactory results can also be obtained when the acid is added to slag which has been previously mixed with water. This procedure may be desirable in the processing of water-ground slag, to avoid drying the product before processing. The optimum ratios of acid, water, and slag indicated above also apply here.

It has also been demonstrated that the process is adaptable to using a diluted sulfuric acid, which has the effect of somewhat slowing down the initial fast chemical reaction. This is accomplished by adding less than a unit weight of water to a unit weight of slag with mixing, and then adding with agitation about a unit weight of acid which has been mixed with such an amount of water that the total weight of water initially added plus that added with the acid is equivalent to about a unit weight of slag, and allowing the mixture to react to form a substantially dry, solid material.

The solidified slag reaction product is preferably allowed to digest (or age). The major part of the iron is solubilized during the initial reaction. However, solubilization of copper and other metals is slower and maximum yield requires a digestion or aging period. The substantially dry reaction product may be held at a temperature generated by the initial reaction (e.g., 75° to 100°C.), or heated to a higher temperature, or cooled and aged at ambient temperature. Lower temperatures require prolonged digestion times to solubilize copper and other metal values. For example, ambient temperatures will require several days to reach maximum solubilization. Higher temperatures may effect solubilization within a few hours. Normally 80 percent or more of the copper values can be solubilized.

The exact chemical reactions which occur in the course of the process are not known, but it is believed that the metal values are predominantly converted to the form of sulfate salts. The product formed, when the weight ratio of water and slag material is about 1:1 and the weight of the concentrated sulfuric acid used is about equal to that of the weight of slag, is substantially dry and crumbly and is, therefore, easily handled or stock-piled.

The water-soluble metal values, especially the copper values, contained in the reaction product is easily leached with water. The amount of water used for leaching may vary over a wide range, with from about 4 to 10 times by weight water per unit weight of digested slag being found suitable. Leaching time can vary over a wide range. The greater portion of water-soluble values are extracted in a short leaching time due to the nature and form of the digested slag. Leaching times varying from about 30 minutes to about 4 hours have been found satisfactory in most cases for substantially complete extraction of the solubilized metal values. Shorter or longer times may be feasible depending upon the nature of the slag material and the degree of agitation.

Leaching may be carried out at temperatures ranging from ambient temperature to near boiling, with higher temperatures promoting a more rapid extraction of the water-soluble values. The extraction of more than 70 percent of the copper values can be attained with ambient leaching temperatures. When greater extraction percentages are desired, the temperature may be raised or countercurrent leaching in a plurality of stages may be employed.

The leach solution may be separated from the insoluble residue material by various known procedures. It has been found that the separation is readily effected by conventional settling and decantation, or by filtration. The solid residue is predominantly silicious residue material and may be discarded. The soluble metal values may be recovered from the leach solution by any known process, such as electrowinning or a suitable chemical technique.

The process disclosed is one in which the majority of the metal value in slag, especially copper, can be recovered by utilization of easily procured and inexpensive materials, sulfuric acid being readily produced from the waste gas products of the smelting operation which yields the slag treated. Indeed, the process provides a convenient and economically advantageous means for consuming excess acid produced in the treatment of copper smelter flu gases to remove sulfur dioxide therefrom. The critical balance of the materials used in this process allows for recovery without formation of gel material. Furthermore, the exothermic nature of this process allows for rapid completion of the essential reactions of the process without the need for supplying extraneous heat.

The following examples are illustrative only and are not meant to be limiting upon the invention concept. All parts and percentages are by weight unless otherwise indicated.

EXAMPLE I

A reverberatory slag obtained from the refining of a copper sulfide ore was assayed with the analysis shown in Table I:

TABLE I

| Component | Cu | Zn | Fe | Fe$_3$O$_4$ | SiO$_2$ | Al$_2$O$_3$ | CaO | Pb | As | Mo | Sb |
|---|---|---|---|---|---|---|---|---|---|---|---|
| Percent | .74 | 4.24 | 30.8 | 2.5 | 39.2 | 4.4 | 6.4 | .15 | .2 | .01 | .04 |

The slag was ground to minus 80 mesh. The particle size distribution was 15 percent +100 mesh, 35 percent −100 mesh and +200 mesh, and 50 percent −200 mesh.

Thirty parts by weight by the particulate slag was mixed with 36 parts by weight of concentrated sulfuric acid and the acid-slag slurry was mixed, with vigorous agitation, with 30 parts by weight of water. The mass rapidly converted to a dry solid at a temperature near 90°C., and was allowed to digest for 24 hours at such autogenously developed.

The dry, solid product obtained was, after digestion, leached with 300 parts of water at a temperature of about 90°C. and with agitation for 1 hour. The insoluble residue was separated from the leach solution by vacuum filtration. The insoluble residue composition was as shown in Table II:

TABLE II

| Component | Cu | Zn | Fe | $Fe_3O_4$ | $SiO_2$ | $Al_2O_3$ | CaO | Pb |
|---|---|---|---|---|---|---|---|---|
| Percent of original content remaining in residue | 15 | 7 | 6 | 44 | 94 | 27 | 86 | 92 |
| Percent concentration in Residue | 0.17 | 0.4 | 2.75 | 1.1 | 55.2 | 1.2 | 7.8 | 0.25 |

The amount of metal values extracted into the aqueous solution and their concentration therein were as shown in Table III:

TABLE III

| Component | Cu | Zn | Fe (total) | $Fe_3O_4$ | $SiO_2$ | $Al_2O_3$ | CaO | Pb |
|---|---|---|---|---|---|---|---|---|
| % Original Material extracted into filtrate | 85 | 93 | 94 | 56 | 6 | 73 | 14 | 8 |
| Concentration in Filtrate in g/l | 0.6 | 3.6 | 30 | — | 2.3 | 3.2 | 0.8 | .01 |

EXAMPLE II

A sample of slag material as described in Example I above was treated in a similar manner as in Example I except that 10 parts of water was initially added to the slag and then a mixture of 20 parts water and 36 parts concentrated sulfuric acid was added to the aqueous slag slurry. The resultant residue and aqueous solution assay was substantially the same as given in Tables II and III of Example I.

EXAMPLE III

The process of Example I above was followed except that, after the initial rapid reaction, the dry solid material was allowed to cool and digested at temperatures ranging from 2°C. to 95°C. The percent recovery of copper with respect to digestion temperature is given as follows:

| Temperature | Percent Copper Extraction |
|---|---|
| 2°C. | 30 |
| 30°C. | 55 |
| 40°C. | 60 |
| 80°C. | 80 |
| 90°C. | 85 |
| 95°C. | 88 |

EXAMPLE IV

The process of Example I above was followed except digestion time was varied from 1 minute to 30 hours.

The results show a copper recovery greater than 80 percent after 20 hours.

EXAMPLE V

The process of Example I above was followed except that, after the initial rapid reaction, the solid material was allowed to cool to ambient temperature and the digestion time varied from 1 day to 30 days. Percent recovery of copper increased with time and reached 80 percent after about 10 days.

It will be understood that it is intended to cover all changes and modifications of the examples of the invention herein chosen for the purpose of illustration which do not constitute departures from the spirit and scope of the invention.

What is claimed is:

1. A process for the recovery of metal values from copper smelter slag material which comprises mixing with agitation a unit part by weight of slag and about a unit part by weight of concentrated sulfuric acid to form an acid-slag mixture, incorporating in the acid-slag mixture about a unit part by weight of water, and allowing the mixture to react to produce a dry, solid material in which metal values are converted to water-soluble form readily separable from the insoluble silicious residue.

2. A process according to claim 1 wherein the dry, solid material is allowed to age for a time sufficient to increase the degree of conversion of metal values to water-soluble form.

3. A process according to claim 2 wherein the dry, solid material is maintained at an autogenously developed temperature of from about 75°C. to about 100°C.

4. A process according to claim 2 wherein the aqueous acidic slag mixture is maintained at the elevated temperature for the period of time of from 8 to 30 hours.

5. A process according to claim 1 wherein the initial slag material is in particulate form.

6. A process according to claim 1 wherein the dry solid reaction product is subjected to a leaching operation with an aqueous solvent to extract the soluble metal values from the insoluble residue.

7. A process for recovery of metal values from copper smelter slag material which comprises mixing with about one part by weight of the slag material up to one parat of water, adding with agitation about one part of concentrated sulfuric acid and up to about one part of water to form a mixture which contains a total slag-to-water ratio of about 1:1 thereby to produce a substantially dry, solid material, allowing the resulting dry, solid material to react for a time sufficient to insure maximum conversion of metal values to water-soluble form, and leaching the resulting dry, solid reaction product with water to recover in the leach solution metal values originally present in the slag.

* * * * *